(12) United States Patent
Son et al.

(10) Patent No.: US 8,617,269 B2
(45) Date of Patent: Dec. 31, 2013

(54) CATALYTIC COMBUSTOR AND FUEL REFORMER HAVING THE SAME

(75) Inventors: In-Hyuk Son, Suwon-si (KR);
Woo-Cheol Shin, Suwon-Si (KR);
Jin-Goo Ahn, Suwon-Si (KR);
Jong-Rock Choi, Suwon-Si (KR);
Sung-Chul Lee, Suwon-Si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 610 days.

(21) Appl. No.: 12/616,115

(22) Filed: Nov. 10, 2009

(65) Prior Publication Data

US 2010/0303681 A1    Dec. 2, 2010

(30) Foreign Application Priority Data

May 28, 2009   (KR) .................. 10-2009-0046894

(51) Int. Cl.
*B01J 8/00* (2006.01)
(52) U.S. Cl.
USPC ........... 48/127.9; 422/149; 422/607; 422/630
(58) Field of Classification Search
USPC ............... 48/61–118.5, 127.1, 127.9, 48/197 R–197 A; 422/129–242; 429/400–535
See application file for complete search history.

(56) References Cited

U.S. PATENT DOCUMENTS

| | | | |
|---|---|---|---|
| 5,884,473 A * | 3/1999 | Noda et al. ............. | 60/274 |
| 6,065,957 A | 5/2000 | Kondo et al. | |
| 6,645,443 B1 | 11/2003 | Vogel et al. | |
| 2003/0233789 A1 | 12/2003 | Dauer et al. | |
| 2004/0047800 A1 * | 3/2004 | Sennoun et al. .............. | 423/652 |
| 2004/0154222 A1 | 8/2004 | Burch et al. | |
| 2004/0187386 A1 | 9/2004 | Wangerow et al. | |
| 2005/0287401 A1 | 12/2005 | Kim et al. | |
| 2006/0008683 A1 | 1/2006 | Kim et al. | |
| 2007/0104625 A1 | 5/2007 | Su | |

(Continued)

FOREIGN PATENT DOCUMENTS

| | | |
|---|---|---|
| CN | 1753225 A | 3/2006 |
| CN | 1941483 A | 4/2007 |

(Continued)

OTHER PUBLICATIONS

KIPO Office Action dated May 31, 2011 for Korean priority patent application 10-2009-0046894, 1 page.

(Continued)

*Primary Examiner* — Imran Akram
(74) *Attorney, Agent, or Firm* — Christie, Parker & Hale, LLP (57) ABSTRACT

A catalytic combustor and a fuel reformer having the same. The catalytic combustor includes a housing having a cylindrical reaction portion and a second reaction portion surrounding the first reaction portion in a double tube shape. The housing has a first opening for supplying a first fuel and an oxidant to the first reaction portion and a second opening through which an exhaust in the second reaction portion is discharged. The first and second openings are disposed at first sides of the first and second reaction portions, respectively. The first and second reaction portions are connected with each other so that the fluid is communicated with the first and second reaction portions at second sides of the first and second reaction portions. A catalyst is disposed in the first reaction portion, and a mesh layer is inserted into the second reaction portion.

24 Claims, 6 Drawing Sheets

(56) References Cited

U.S. PATENT DOCUMENTS

| | | |
|---|---|---|
| 2008/0268301 A1 | 10/2008 | Lee et al. |
| 2010/0158769 A1 | 6/2010 | Lee et al. |
| 2010/0226834 A1 | 9/2010 | Son et al. |
| 2010/0308481 A1* | 12/2010 | Oglesby et al. ............... 261/131 |

FOREIGN PATENT DOCUMENTS

| | | |
|---|---|---|
| DE | 102 34 043 | 2/2004 |
| EP | 1 394 103 A1 | 3/2004 |
| EP | 1 987 876 A1 | 11/2008 |
| EP | 2 198 951 A2 | 6/2010 |
| GB | 2 268 694 A | 1/1994 |
| JP | 06-337104 | 12/1994 |
| JP | 07-126002 | 5/1995 |
| JP | 10-167701 | 6/1998 |
| JP | 11-37426 | 2/1999 |
| JP | 2000-146128 | 5/2000 |
| JP | 2001-227419 | 8/2001 |
| JP | 2001-254907 | 9/2001 |
| JP | 2002-226202 | 8/2002 |
| JP | 2003-83515 | 3/2003 |
| JP | 2005-195254 | 7/2005 |
| JP | 2006-349257 | 12/2006 |
| KR | 10-0814888 B1 | 3/2008 |
| KR | 10-0823515 B1 | 4/2008 |
| KR | 10-2010-0071517 | 6/2010 |
| WO | WO 2009027959 A1 * | 3/2009 |

OTHER PUBLICATIONS

JPO Office action dated Dec. 6, 2011, for corresponding Japanese Patent Application No. 2009-219174, 7 pages.

KIPO Office action dated Mar. 21, 2011, for Korean priority Patent application 10-2009-0046894.

European Search Report dated Apr. 21, 2011, for corresponding European Patent application 10250127.7.

Japanese Office action dated Apr. 17, 2012, for corresponding Japanese Patent application 2009-219174, (7 pages).

SIPO Patent Gazette dated Jul. 18, 2012, for corresponding Chinese Patent application 200910252851.4, (3 pages).

EP Office Action dated Jul. 29, 2013 for corresponding EP Application No. 10250127.7 (8 pages).

* cited by examiner

CATALYTIC COMBUSTOR AND FUEL REFORMER HAVING THE SAME

CROSS-REFERENCE TO RELATED APPLICATIONS

This application claims priority to and the benefit of Korean Patent Application No. 10-2009-0046894, filed on May 28, 2009, in the Korean Intellectual Property Office, the entire content of which is incorporated herein by reference.

BACKGROUND OF THE INVENTION

1. Field of the Invention

The following description relates to a catalytic combustor capable of inducing oxidation of a fuel and improving the thermal efficiency of a reactor, and a fuel reformer having the same.

2. Description of the Related Art

A combustor is a device that generates heat and high-temperature gas by oxidizing a fuel. The heat and high-temperature gas, generated from the combustor, may be used for reforming reaction of a reformer, preheating of fuel or water, and the like. The combustor may be manufactured in such a manner that allows a fuel sprayed into a combustion chamber to be directly burned, that allows a fuel to be burned through an oxidation catalyst, or the like. Here, in embodiments of the present invention, the device that allows a fuel to be oxidized through an oxidation catalyst is referred to as a catalytic combustor.

A catalytic combustor allows a fuel to be burned (or oxidized) through contact with a catalyst at a lower operating temperature than that of a direct burning type combustor such as a burner. Therefore, in order to improve efficiency, the catalytic combustor is typically manufactured to have a faster space velocity than that in the direct combustor. In addition, the catalytic combustor is less expensive to operate and generates less nitrogen oxide than the direct burning type combustor.

Also, the catalytic combustor allows a fuel to be burned at a relatively low temperature. However, in the catalytic combustor, it is difficult to allow a fuel to be completely burned as compared with the direct burning type combustor. If the fuel oxidation rate in the catalytic combustor is low, unburned fuel, carbon monoxide caused by partial oxidation of the unburned fuel and steam are contained in a large amount in an exhaust produced from the catalytic combustor.

SUMMARY OF THE INVENTION

An aspect of an embodiment of the present invention is directed toward a catalytic combustor capable of inducing the complete oxidation of a fuel and improving the thermal efficiency of a reactor by utilizing a dual oxidation structure.

Another aspect of an embodiment of the present invention is directed toward a catalytic combustor capable of inducing the complete oxidation of a fuel and improving the thermal efficiency of a reactor by utilizing a dual oxidation structure and a dual fuel structure.

Another aspect of an embodiment of the present invention is directed toward a fuel reformer having the aforementioned catalytic combustor.

According to an aspect of the present invention, a catalytic combustor is provided. The catalytic combustor includes a housing having a cylindrical first reaction portion and a second reaction portion surrounding the first reaction portion in a double tube shape, the housing having a first opening for supplying a first fuel and an oxidant to the first reaction portion and a second opening through which an exhaust in the second reaction portion is discharged, the first and second openings being respectively disposed at first sides of the first and second reaction portions, and the first and second reaction portions being connected with each other at second sides of the first and second reaction portions so that the flow of a fluid in the first and second reaction portions forms a counter flow; a catalyst layer disposed in the first reaction portion; and a mesh layer inserted into the second reaction portion.

In one embodiment, the catalyst layer is disposed at a rear-end portion of the first reaction portion and the mesh layer is disposed to be adjacent to the catalyst layer so that the mesh layer is accordingly heated by a heat energy from the first reaction portion.

According to another embodiment of the present invention, there is provided a catalytic combustor which includes a housing having a cylindrical first reaction portion and a second reaction portion surrounding the first reaction portion in a double tube shape, the housing having a first opening for supplying a first fuel and an oxidant to the first reaction portion and a second opening through which an exhaust in the second reaction portion is discharged, the first and second openings being respectively disposed at first sides of the first and second reaction portions, and the first and second reaction portions being connected with each other at second sides of the first and second reaction portions so that the flow of a fluid in the first and second reaction portions forms a counter flow; a first catalyst layer disposed in the first reaction portion; and a second catalyst layer disposed in the second reaction portion.

In one embodiment, the catalyst layer is disposed at a rear-end portion of the first reaction portion. The second catalyst layer may include a mesh layer and an active material coupled with the mesh layer. Further, the active material amount of the active material used in the second catalyst layer is less than that in the first catalyst layer. In one embodiment, the active material may be coated at a density between about 0.01 and 0.4 g per 1 cc of the mesh layer.

According to still another embodiment of the present invention, there is provided a catalytic combustor which includes a housing having a cylindrical first reaction portion and a second reaction portion surrounding the first reaction portion in a double tube shape, the housing having a first opening for supplying a first fuel and an oxidant to the first reaction portion and a second opening through which an exhaust in the second reaction portion is discharged, the first and second openings being respectively disposed at first sides of the first and second reaction portions, and the first and second reaction portions being connected with each other at second sides of the first and second reaction portions so that the flow of a fluid in the first and second reaction portions forms a counter flow; a first catalyst layer disposed in the first reaction portion; a mesh layer disposed into the second reaction portion; and a fuel supply path for supplying a second fuel between the first and second reaction portions.

In one embodiment, the catalyst layer is disposed at a rear-end portion of the first reaction portion and the mesh layer is disposed adjacent to the catalyst layer. In one embodiment, the fuel supply path is configured to supply the second fuel in an amount between about 1 and 15% of the supply amount of the first fuel. The second fuel may include an off gas containing hydrogen, exhausted from an anode of a fuel cell.

According to still another embodiment of the present invention, there is provided a catalytic combustor which includes a housing having a cylindrical first reaction portion and a second reaction portion surrounding the first reaction portion in a double tube shape, the housing having a first opening for supplying a first fuel and an oxidant to the first reaction portion and a second opening through which an exhaust in the second reaction portion is discharged, the first and second openings being respectively disposed at first sides of the first and second reaction portions, and the first and second reaction portions being connected with each other at second sides of the first and second reaction portions so that the flow of a fluid in the first and second reaction portions forms a counter flow; a first catalyst layer disposed in the first reaction portion; a second catalyst layer disposed in the second reaction portion; and a fuel supply path for supplying a second fuel between the first and second reaction portions.

In one embodiment, the first catalyst layer is disposed at a rear-end portion of the first reaction portion. The second catalyst layer may include a mesh layer and an active material coated on the mesh layer. Further, in one embodiment, the active material amount used in the second catalyst layer is less than that in the first catalyst layer. In one embodiment, the active material may be coated at a density between about 0.01 and 0.4 g per 1 cc of the mesh layer. In one embodiment, the fuel supply path is configured to supply the second fuel in an amount between about 1 and 15% of the supply amount of the first fuel. The second fuel may include an off gas containing hydrogen, exhausted from an anode of a fuel cell.

The first catalyst may include a metallic honeycomb support having durability at a high temperature and an active material coupled with the support. In one embodiment, the cell density of the honeycomb support in the first catalyst layer may be between about 400 and about 600 cells per square inch.

In one embodiment, the catalytic combustor may further include a distributing portion disposed at an upstream side of the first catalyst layer based on the flow of the fuel. The distributing portion may be formed of a metallic honeycomb monolith having durability at a high temperature. The space velocity of a fluid in the distributing portion may be faster than that of a fluid in the first catalyst layer. In one embodiment, the space velocity of the fluid in the first catalyst layer may be between about 1000 and about 50,000/hr. In another embodiment, the cell density of the honeycomb monolith in the distributing portion is less than that of the honeycomb support in the first catalyst layer. The cell density of the honeycomb monolith in the distributing portion may be between about 100 and about 200 cells per square inch.

The catalytic combustor may further include a flashback arresting portion disposed at an upstream side of the distributing portion based on the flow of the fluid. The flashback arresting portion may be formed of a metallic honeycomb monolith having durability at a high temperature. The cell density of the honeycomb monolith in the flashback arresting portion may be the same as that of the honeycomb monolith in the distributing portion.

The first catalyst layer and/or second catalyst layer may include palladium(Pd), platinum(Pt), $Co_3O_4$, PdO, $Cr_2O_3$, $Mn_2O_3$, CuO, $Fe_2O_3$, $V_2O_3$, NiO, $MoO_3$, and/or $TiO_2$.

The mesh layer may be formed of a metallic honeycomb monolith having durability at a high temperature. The mesh layer may be formed into a two-stage structure. In one embodiment, the cell density of the honeycomb monolith in the mesh layer may be between about 50 and about 1000 cells per square inch.

According to still another embodiment of the present invention, there is provided a fuel reformer which includes any one of the catalytic combustors according to the embodiments of the present invention; and a reforming reaction portion for generating a reformate by receiving heat energy generated from the catalytic combustor and for reforming a fuel.

According to the embodiments of the present invention, a fuel is more completely oxidized in a catalytic combustor. Further, the catalytic combustor allows a thermal gradient to be uniform by using conduction and convection in the dual oxidation structure, so that hot spots are reduced. Accordingly, the thermal efficiency of the catalytic combustor can be considerably improved. Further, although an oxidation catalyst may be used only at a front end in the dual oxidation structure, i.e., a small amount of catalyst is used, the complete oxidation of a fuel can still be easily induced. Further, it is possible to improve the performance and efficiency of a fuel reformer having the catalytic combustor.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thicknesses and sizes of elements are exaggerated for clarity.

Figure 1:
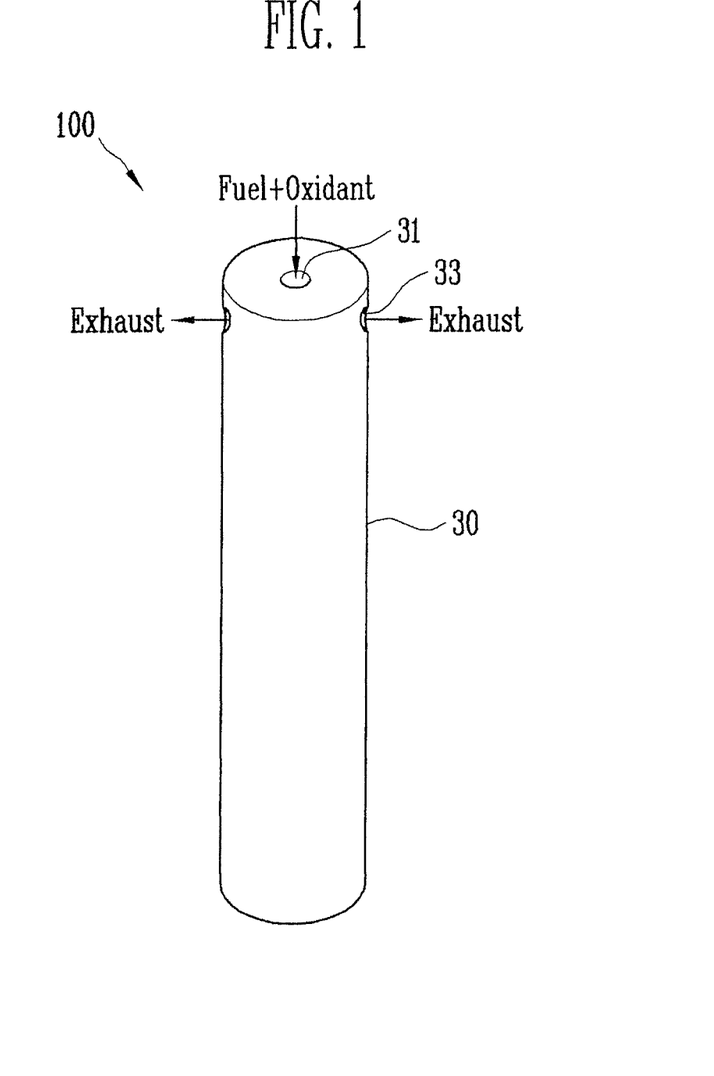
FIG. 1 is a schematic perspective view of a catalytic combustor according to an embodiment of the present invention.
Figure 2:
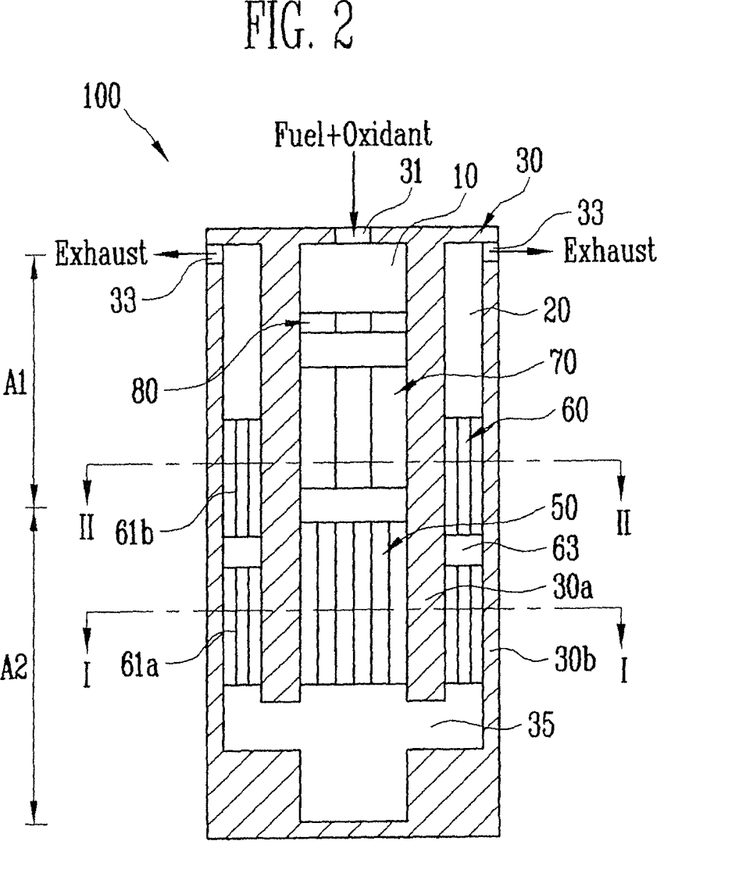
FIG. 2 is a schematic longitudinal sectional view of the catalytic combustor of FIG. 1.
Figure 3:
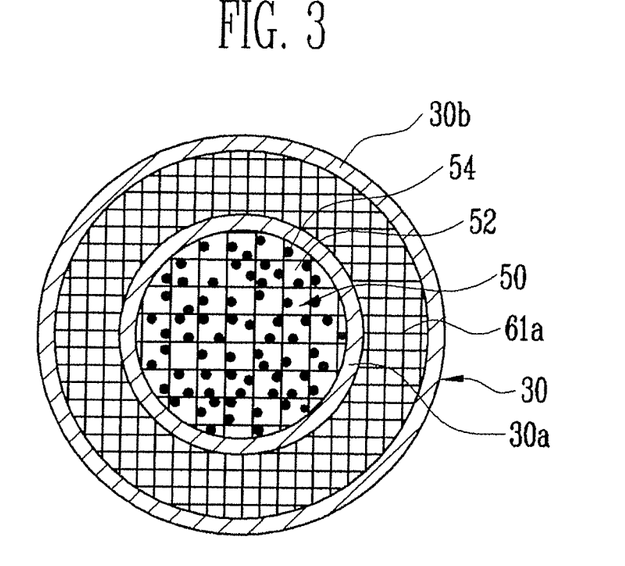
FIG. 3 is a schematic cross-sectional view of the catalytic combustor according to the embodiment of the present invention.
Figure 4:
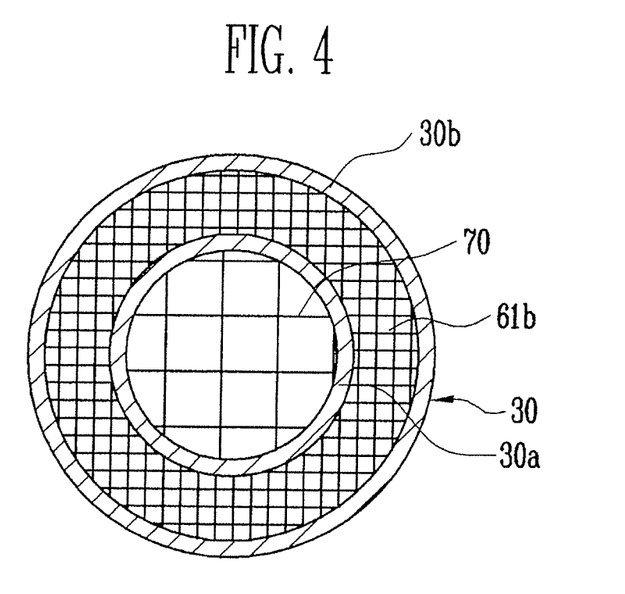
FIG. 4 is another schematic cross-sectional view of the catalytic combustor according to the embodiment of the present invention.

FIG. 1 is a schematic perspective view of a catalytic combustor according to an embodiment of the present invention. FIG. 2 is a schematic longitudinal sectional view of the catalytic combustor of FIG. 1. FIG. 3 is a schematic cross-sectional view of the catalytic combustor according to the embodiment of the present invention. The cross-sectional view of FIG. 3 may correspond to a cross-sectional view taken along line I-I of FIG. 2 (or a corresponding cross-sectional view of the catalytic combustor of FIG. 1). FIG. 4 is another schematic cross-sectional view of the catalytic combustor according to the embodiment of the present invention. The cross-sectional view of FIG. 4 may correspond to a cross-sectional view taken along line II-II of FIG. 2 (or a corresponding cross-sectional view of the catalytic combustor of FIG. 1).

Referring to FIGS. 1 and 2, the catalytic combustor 100 includes a housing 30 having first and second reactor portions 10 and 20; a catalyst layer 50 disposed in the first reaction portion 10; and a mesh layer 60 disposed in the second reaction portion 20.

The housing 30 includes a first housing 30a having the first reaction portion 10 formed therein and a second housing 30b having the second reaction portion 20 formed between the first and second housings 30a and 30b while surrounding the first reaction portion 10 in a double tube shape. In an embodiment of the present invention as shown, both ends of the tubular or cylindrical housing 30 are substantially closed.

The housing 30 has at least one first opening 31 and at least one second opening 33. The first opening 31 serves as a passage through which a fuel (or first fuel) is supplied to the first reaction portion 10. The first opening 31 is formed at one side in the length direction of the cylindrical housing 30. The second opening 33 serves as a passage through which an exhaust in the second reaction portion 20 is discharged to the exterior of the housing 30. The second opening 33 is formed at one side in the length direction of the cylindrical housing 30. The first and second openings 31 and 33 may be disposed adjacent to each other at one side of the housing 30.

The cylindrical housing 30 has a passage 35 formed at the other side in the length direction of the housing 30. The other side is the opposite side to the one side. The passage 35 allows the first and second reaction portions 10 and 20 to be connected to each other so that a fluid is communicated with the first and second reaction portions 10 and 20. An exhaust produced in the first and second reaction portions 10 and 20 is discharged out of the catalytic combustor 100 through the second opening 33 provided at the downstream side of the second reaction portion 20.

In other words, the first opening 31 is connected to one end of the first reaction portion 10 (e.g., an upstream side of the first reaction portion 10 based on the flow of a fluid in the catalytic combustor 100), and one end of the passage 35 is connected to the other end of the first reaction portion 10 (e.g., the downstream side based on the flow of the first reaction portion 10 of the fluid in the catalytic combustor 100). The other end of the passage 35 is connected to the other end of the second reaction portion 20 (e.g., the upstream side of the second reaction portion 20 based on the flow of the fluid in the catalytic combustor 100), and the second opening 33 is connected to one end of the second reaction portion 20 (e.g., the downstream side of the second reaction portion 20 based on the flow of the fluid in the catalytic combustor 100). That is, the housing 30 has the first and second reaction portions 10 and 20 arranged to have a counter flow or U-shaped flow structure in which a fluid in the housing 30 flows backward. This structure is referred to as a dual oxidation structure in embodiments of the present invention.

The catalyst layer 50 is disposed at a rear-end portion of the first reaction portion 10. In other words, when the first reaction portion 10 is approximately divided into a first area A1 positioned at the upstream side on the flow of the fuel and a second area A2 positioned at the downstream side on the flow of the fuel, the catalyst layer 50 is disposed in the second area A2.

As illustrated in FIG. 3, the catalyst layer 50 may include a metallic or ceramic honeycomb support 52 and an active material 54 coupled with the support 52. The active material 54 may include platinum, palladium, and/or another precious metal. For example, in one embodiment, the catalyst layer 50 includes Pd, Pt, $Co_3O_4$, PdO, $Cr_2O_3$, $Mn_2O_3$, CuO, $Fe_2O_3$, $V_2O_3$, NiO, $MoO_3$ and/or $TiO_2$.

The mesh layer 60 is disposed at a front-end portion of the second reaction portion 20 (adjacent to the rear-end portion at which the catalyst layer 50 is disposed) so that an unburned fuel from the first reaction portion 10 is well oxidized. For example, the mesh layer 60 may be formed of a metallic honeycomb monolith having durability at a high temperature. The unburned fuel is oxidized when in contact with the metallic mesh layer 60 and heated to about 150 to 400° C. in a reaction within the catalytic combustor 100. By employing the mesh layer 60 to be disposed to be adjacent to the catalyst layer 50, the fuel is oxidized twice, and accordingly, the complete oxidation of the fuel can be induced.

Furthermore, in an embodiment, the mesh layer 60 may be formed into a first-stage mesh layer 61a and a second-stage mesh layer 61b based on the flow of a fluid in the second reaction portion 20. By employing the mesh layers 61a and 61b with a two-stage structure, a turbulent flow is formed in the flow of the unburned fuel at a space 63 between the first-stage mesh layer 61a and the second-stage mesh layer 61b, so that the entire unburned fuel passing through the mesh layer 60 can be more completely oxidized and in contact with the mesh layer 60.

The catalytic combustor 100 according to the embodiment of the present invention may further include a distributing portion 70 disposed at a front-end portion of the first reaction portion 10. The distributing portion 70 is disposed at the upstream side of the catalyst layer 50 on the flow of the fuel. The distributing portion 70 appropriately distributes a fuel flowing into the first reaction portion 10 and sends the distributed fuel to the catalyst layer 50. By employing the distributing portion 70, it is possible to prevent or reduce large hot spots from being generated by the oxidation of the fuel concentrated on a specific point at the one end (i.e., at the upstream side) of the catalyst layer 50.

The distributing portion 70 is configured in accordance with the catalyst layer 50. The distributing portion 70 may be formed of a metallic honeycomb monolith having durability at a high temperature, as illustrated in FIG. 4. That is, in the interior of the first reaction portion 10, the space velocity of a fluid flowing in the distributing portion 70 is faster than that in the catalyst layer 50. For example, the space velocity in the catalyst layer 50 may be between about 1000 and about 50,000/hr. In other words, the cell density in the honeycomb monolith of the distributing portion 70 is formed less than that in the honeycomb support 52 of the catalyst layer 50. For example, the cell density in the honeycomb monolith of the distributing portion 70 may be between about 100 and about 200 cells per square inch.

Referring to FIG. 1 again, the catalytic combustor 100 according to an embodiment of the present invention includes a flashback arresting portion 80 disposed in the front-end portion of the first reaction portion 10. The flashback arresting portion 80 is disposed at an upstream side of the catalyst layer 50 and/or the distributing portion 70. The flashback arresting portion 80 prevents or reduces a spark generated in the catalyst layer 50 from being spread toward the first opening 31.

The flashback arresting portion 80 may be formed of a metallic honeycomb monolith having durability at a high temperature. The flashback arresting portion 80 is configured in accordance with the catalyst layer 50 and/or the distributing portion 70.

For example, in one embodiment, the flashback arresting portion 80 has the same cell density and/or sectional structure (or sectional shape) as the distributing portion 70. The length of the flashback arresting portion 80 may be different from that of the distributing portion 70 along the flow direction of the fluid flowing in the interior of the first reaction portion 10.

In an embodiment of the present invention, a fuel and an oxidizer may be individually supplied through a plurality of first openings. The fuel includes a hydrocarbon-based fuel such as methane, butane and/or propane. The oxidant includes air.

According to the aforementioned configuration, when a first fuel and an oxidant are flowed into the first reaction portion 10 through the first opening 31, the first fuel passes through the area of the catalyst layer 50 via the flashback arresting portion 80 and the distributing portion 70. In this case, the first fuel is oxidized in the catalyst layer 50 and any unburned fuel not oxidized in the catalyst layer 50 is secondarily oxidized while passing through the mesh layer 60.

Accordingly, the catalytic combustor 100 allows a thermal gradient to be uniform by using conduction and convection in the dual oxidation structure, so that hot spots can be reduced. Further, the complete oxidation of a fuel can be promoted by utilizing an oxidation catalyst only in the front-stage portion (that is, the first reaction portion) in the dual oxidation structure, so that manufacturing cost may be reduced.

Figure 5:
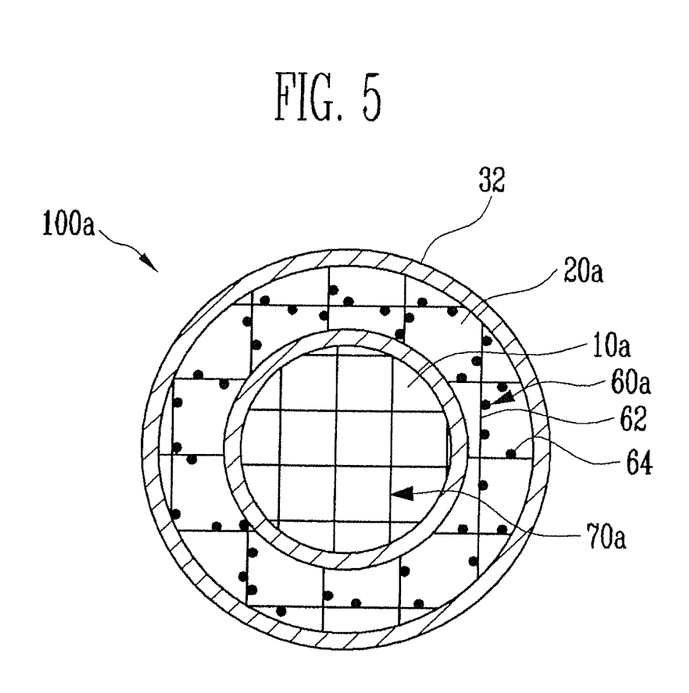
FIG. 5 is a schematic cross-sectional view of a catalytic combustor according to another embodiment of the present invention.

FIG. 5 is a schematic cross-sectional view of a catalytic combustor according to another embodiment of the present invention. The cross-sectional view of FIG. 5 may correspond to a cross-sectional view taken along line II-II of FIG. 2 (or a corresponding cross-sectional view of the catalytic combustor of FIG. 1).

Referring to FIG. 5, the catalytic combustor 100a according to the embodiment of the present invention includes a housing 32 having a cylindrical first reaction portion 10a and a second reaction portion 20a surrounding the first reaction portion 10a in a double tube shape; a first catalyst layer (not shown) disposed in the first reaction portion 10a; a distributing portion 70a disposed at an upstream side of the first catalyst layer in the first reaction portion 10a; and a second catalyst layer 60a disposed in the second reaction portion 20a.

The first and second reaction portions 10a and 20a of the housing 32 may substantially have the same structures and shapes as the first and second reaction portions 10 and 20 illustrated in FIG. 2, respectively.

The first catalyst layer and the distributing portion 70a may substantially have the same structures and shapes as the catalyst layer 50 and the distributing portion 70, illustrated in FIG. 2, respectively.

The second catalyst layer 60a may be formed into a first-stage mesh layer and a second-stage mesh layer on the flow of a fluid in the second reaction portion 20a and a space may be formed between the first-stage and the second-stage mesh layers as the structure is illustrated in FIG. 2.

In an embodiment, the second catalyst layer 60a has a mesh layer 62 and an active material 64 coupled to the mesh layer 62. An amount (or a predetermined amount) of active material 64 may be coupled to the mesh layer 62. For example, the active material 64 may be coated at a density between about 0.01 and about 0.4 g per 1 cc of the mesh layer 62. The active material 64 includes palladium and/or platinum. When the active material is coated at a less density than that described above, the effect of fuel combustion caused by the active material is slight. When the active material is coated at a larger density than that described above, the use amount of a precious metal is increased, and therefore, manufacturing cost may be increased.

In the embodiment of the present invention, the second catalyst layer 60a allows any suitable unburned fuel flowed out from the first reaction portion 10a to be secondarily oxidized. Here, the unburned fuel is a fuel passing through the first catalyst layer without being oxidized by the first catalyst layer. By employing the dual oxidation structure together with a small active material for promoting oxidation of the unburned fuel, the fuel can be oxidized (or completely oxidized) more effectively than in the embodiment described with reference to FIG. 2 (that is, the embodiment in which only the mesh layer 60 is disposed in the second reaction portion 20).

Figure 6:
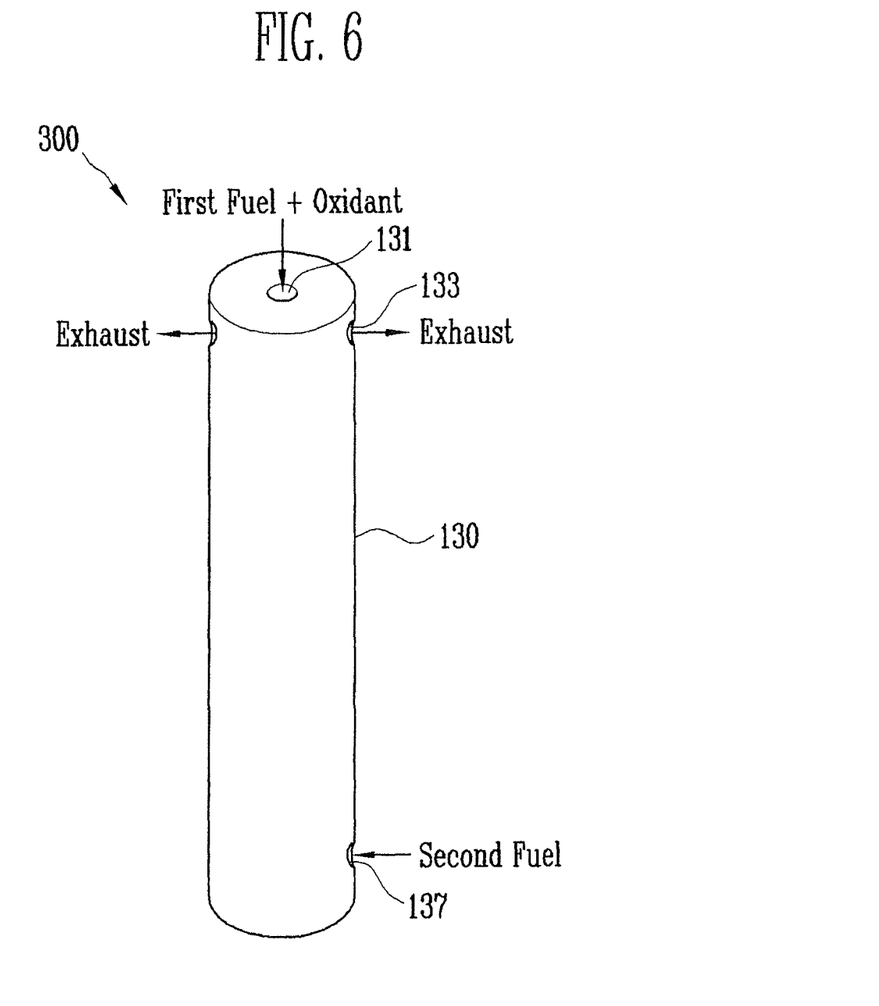
FIG. 6 is a schematic perspective view of a catalytic combustor according to still another embodiment of the present invention.
Figure 7:
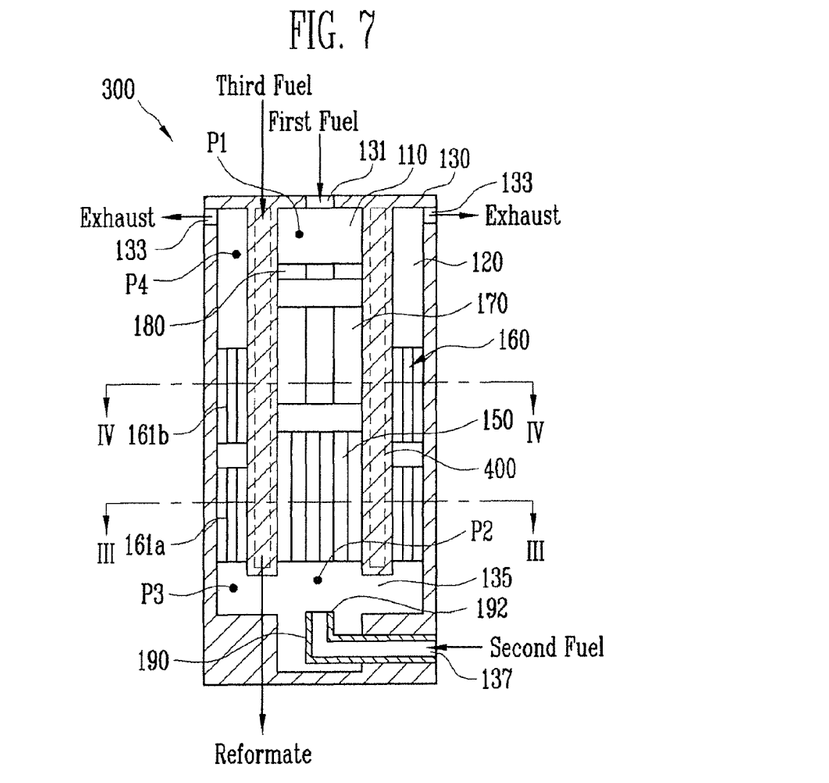
FIG. 7 is a schematic longitudinal sectional view of the catalytic combustor of FIG. 6.

FIG. 6 is a schematic perspective view of a catalytic combustor according to still another embodiment of the present invention. FIG. 7 is a schematic longitudinal sectional view of the catalytic combustor of FIG. 6.

Referring to FIGS. 6 and 7, the catalytic combustor 300 includes a housing 130 having first and second reaction portions 110 and 120, a first opening 131 for inflow of a first fuel to the first reaction portion 110, a second opening 133 for discharging the exhaust from second reaction portion 120; a catalyst layer 150 disposed in the first reaction portion 110; a mesh layer 160 disposed in the second reaction portion 120; and a fuel supply path 190 for supplying a second fuel between the first and second reaction portions 110 and 120.

The housing 130 is formed in the shape of a cylinder having both closed ends. The hosing 130 includes a first housing having the cylindrical first reaction portion 110 formed therein and a second housing having the second reaction portion 120 formed between the first and second housings while surrounding the first reaction portion 100 in a double tube shape. When the length directions of the first and second reaction portions 110 and 120 formed in the double tube shape are substantially parallel with each other in the direction of gravitational force, the first and second reaction portions 110 and 120 are connected to each other so that a fluid is communicated with the first and second reaction portions 110 and 120 through a passage 135 positioned below the first and second reaction portions 110 and 120.

In the embodiment of FIGS. 6 and 7, the structures and shapes of the first and second reaction portions 110 and 120 in the housing 130 are substantially identical to those of the first and second reaction portions 10 and 20 illustrated in FIG. 2. For reference, in FIG. 7, a first point P1 indicates an upstream side or one end of the first reaction portion 110, and a second point P2 indicates a downstream side or the other end of the first reaction portion 110. In FIG. 7, the third point P3 indicates an upstream side or the other end of the second reaction portion 120, and a fourth point P4 indicates a downstream side or one end of the second reaction portion 120.

The catalyst layer 150 is disposed closer to the downstream side than the upstream side of the first reaction portion 110. The structure and shape of the catalyst 150 may be substantially identical to that of the catalyst layer 50 illustrated in FIG. 2.

The structure and shape of the mesh layer 160 may be substantially identical to that of the mesh layer 60 illustrated in FIG. 2. The mesh layer 160 may have first and second mesh layers 161a and 161b with a two-stage structure. In this case, the first and second mesh layers 161a and 161b may substantially have the same structures and shapes as the mesh layers 61a and 61b with a two-stage structure, illustrated in FIGS. 3 and 4.

The catalytic combustor 300 according to the embodiment of the present invention may further include a distributing portion 170 disposed in the first reaction portion 110. The structure and shape of the distributing portion 170 may be substantially identical to that of the distributing portion 70 illustrated in FIG. 2.

In the catalytic combustor 300 according to the embodiment of the present invention, the cross-sectional view taken along line III-III may be substantially identical to that illustrated in FIG. 3. In the catalytic combustor 300 according to the embodiment of the present invention, the cross-sectional view taken along line IV-IV may be substantially identical to that illustrated in FIG. 4.

The catalytic combustor 300 according to the embodiment of the present invention may further include a flashback arresting portion 180 disposed in the first reaction portion 110. The structure and shape of the flashback arresting portion 180 may be substantially identical to that of the flashback arresting portion 80 illustrated in FIG. 2.

The fuel supply path 190 supplies the second fuel to the downstream side of the first reaction portion 110 or the upstream side of the second reaction portion 120. The second fuel is flowed into one end of the fuel supply path 190, and a third opening 137 of the housing 130 may be formed at the one end of the fuel supply path 190. The other end 192 of the fuel supply path 190 may be opened close to the second point P2.

In one embodiment, the second fuel may be a material more easily burned in the mesh layer 160 than the unburned fuel of the first fuel. Only an amount (or a predetermined amount) of the second fuel may be supplied. For example, when about 20 L of combustible hydrocarbon (e.g., methane, butane or the like) expressed by a chemical formula of $C_mH_{2n}$ is supplied per hour, about 0.2 to 3 L of the second fuel may be supplied per hour. If the supply amount of the second fuel is less than 1% or exceeds 15% of the supply amount of the first fuel, the secondary oxidation efficiency of the unburned fuel is lowered due to the addition of the second fuel. Furthermore, if the supply amount of the second fuel exceeds 15% of the supply amount of the first fuel, the used amount of the entire fuel including the second fuel is increased, and therefore, its efficiency is lowered.

When combustible hydrocarbons are used as the first and/or second fuel, the combustion reaction formula of the fuel in the catalytic combustor is as follows.

$$C_mH_{2n}+(m+2n)O_2 \rightarrow mCO_2+nH_2O+\text{calorie} \quad (1)$$

According to the aforementioned configuration, when a first fuel and an oxidant are flowed into the first reaction portion 110 through the first opening 131, the first fuel passes through the area of the catalyst layer 150 via the flashback arresting portion 180 and the distributing portion 170. In this case, the first fuel is oxidized in the catalyst layer 150. An unburned fuel in the first fuel is secondarily oxidized while passing through the mesh layer 160 together with a second fuel supplied at the downstream side of the first reaction portion 110 or the upstream side of the second reaction portion 120. Here, if the second fuel is a material more easily oxidized than an unburned fuel, the unburned fuel mixed with the second fuel is more effectively oxidized by the oxidation heat of the second fuel.

In addition, a catalytic combustor according to still another embodiment of the present invention may be implemented so that the cross-sectional view taken along line IV-IV in the catalytic combustor of FIG. 7 includes components described in the cross-sectional view of FIG. 5.

In other words, the catalytic combustor according to the embodiment of the present invention may be substantially identical to the catalytic combustor 300 illustrated in FIGS. 6 and 7, except that a second catalyst layer is provided in a second reaction portion. The second catalyst layer may be substantially identical to the second catalyst layer 60a of the catalytic combustor 100a illustrated in FIG. 5.

Figure 8:
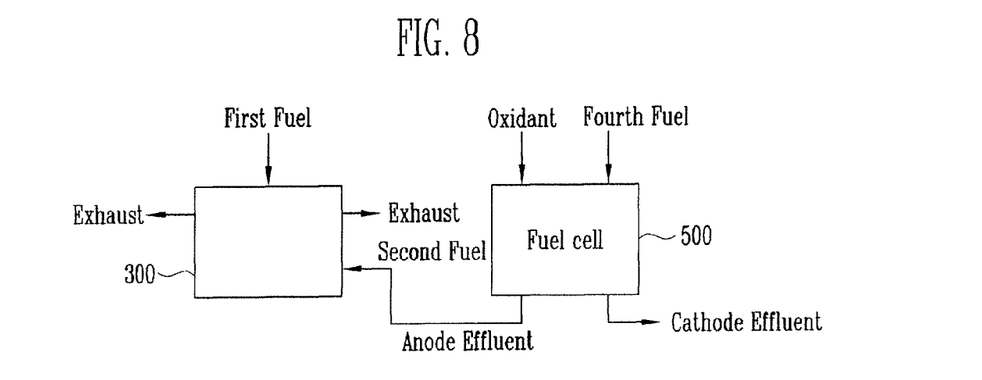
FIG. 8 is a schematic block diagram of a fuel cell system for describing an application of the catalytic combustor of FIG. 6.

FIG. 8 is a schematic block diagram of a fuel cell system for describing an application of the catalytic combustor of FIG. 6.

Referring to FIG. 8, the second fuel supplied to the catalytic combustor 300 according to the embodiment of the present invention includes an anode effluence exhausted from an anode of a fuel cell 500. The anode effluence may be used directly as the second fuel or used as a properly filtered gas containing hydrogen.

The fuel cell 500 includes a power generating system for generating electricity and water through electrochemical reactions of a fuel (fourth fuel) and an oxidant. The fuel cell 500 may be one of various suitable fuel cells such as a polymer electrolyte membrane fuel cell (known in the art). The fourth fuel includes a reformate containing abundant hydrogen or a hydrocarbon-based fuel, and the oxidant includes oxygen in the air. The cathode effluence includes water.

In addition, the catalytic combustors according to the embodiments of the present invention may be used to supply heat to a fuel reformer for supplying the fourth fuel to the fuel cell 500. For example, as illustrated in FIG. 7, a reforming reaction portion 400 is disposed between the first and second reaction portions 110 and 120 so that heat generated from the catalytic combustor 300 can be supplied to the reforming reaction portion 400. The reforming reaction portion 400 may include a steam reforming reaction portion for steam-reforming a third fuel to generate a reformate. The third fuel includes a hydrocarbon-based fuel. The reformate may be used as the fourth fuel of FIG. 8.

The detailed structure and shape of the reforming reaction portion 400 is well known by those skilled in the art. Therefore, detailed description of the reforming reaction portion 400 will not be provided.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A catalytic combustor comprising:
   a housing having a cylindrical first reaction portion and a second reaction portion surrounding the first reaction portion in a double tube shape, the housing having a first opening for supplying a first fuel and an oxidant to the first reaction portion and a second opening for discharging an exhaust in the second reaction portion, the first and second openings being respectively at first sides of the first and second reaction portions, and the first and second reaction portions being connected with each other at second sides of the first and second reaction portions so that the flow of a fluid in the first and second reaction portions forms a counter flow;
   a first catalyst layer in the first reaction portion;

a distributing portion, the distributing portion having a circumference substantially equal to a circumference of the first reaction portion and the entire distributing portion being between the first catalyst layer and the first opening;

a mesh layer in the second reaction portion and configured to be heated by a heat of the first reaction portion, the mesh layer comprising a first-stage mesh layer and a second-stage mesh layer; and a second catalyst layer in the second reaction portion, the second catalyst layer comprising the mesh layer and an active material coupled with the mesh layer, an active material amount of the active material in the second catalyst layer being less than that in the first catalyst layer and the active material of the second catalyst layer being coated at a density between about 0.01 and 0.4 g per 1 cc on the mesh layer, the first-stage mesh layer and the second-stage mesh layer being separated by a space.

2. The catalytic combustor according to claim 1, wherein the first catalyst layer is at a rear-end portion of the first reaction portion.

3. The catalytic combustor according to claim 1, wherein the first catalyst layer comprises a metallic honeycomb support and an active material coupled with the support.

4. The catalytic combustor according to claim 3, wherein a cell density of the honeycomb support in the first catalyst layer is between about 400 and about 600 cells per square inch.

5. The catalytic combustor according to claim 3, wherein the distributing portion is at an upstream side of the first catalyst layer based on the flow of the fuel.

6. The catalytic combustor according to claim 5, wherein the distributing portion comprises a metallic honeycomb monolith configured to flow a fluid with a space velocity in the distributing portion faster than that of a fluid in the first catalyst layer.

7. The catalytic combustor according to claim 6, wherein a space velocity of the fuel and oxidizer in the first catalyst layer is between about 1000 and about 50,000/hr.

8. The catalytic combustor according to claim 6, wherein a cell density of the honeycomb monolith in the distributing portion is less than that of the honeycomb support in the first catalyst layer.

9. The catalytic combustor according to claim 6, wherein a cell density of the honeycomb monolith in the distributing portion is between about 100 and about 200 cells per square inch.

10. The catalytic combustor according to claim 5, further comprising a flashback arresting portion at an upstream side of the distributing portion based on the flow of the fluid.

11. The catalytic combustor according to claim 10, wherein the flashback arresting portion comprises a metallic honeycomb monolith, the distributing portion comprises a metallic honeycomb monolith, and a cell density of the honeycomb monolith in the flashback arresting portion is substantially identical to that of the honeycomb monolith in the distributing portion.

12. The catalytic combustor according to claim 1, wherein the first catalyst layer comprises a material selected from the group consisting of Pd, Pt, $Co_3O_4$, PdO, $Cr_2O_3$, $Mn_2O_3$, CuO, $Fe_2O_3$, $V_2O_3$, NiO, $MoO_3$, $TiO_2$, and combinations thereof.

13. The catalytic combustor according to claim 1, wherein the mesh layer comprises a metallic honeycomb monolith.

14. The catalytic combustor according to claim 13, wherein a cell density of the honeycomb monolith in the mesh layer is between about 50 and about 1000 cells per square inch.

15. The catalytic combustor according to claim 1, further comprising a fuel supply path for supplying a second fuel between the first and second reaction portions.

16. The catalytic combustor according to claim 15, wherein the fuel supply path is configured to supply the second fuel in an amount between about 1% and about 15% of the supply amount of the first fuel.

17. The catalytic combustor according to claim 15, wherein the second fuel comprises an off gas containing hydrogen, discharged from an anode of a fuel cell.

18. A catalytic combustor comprising:

a housing having a cylindrical first reaction portion and a second reaction portion surrounding the first reaction portion in a double tube shape, the housing having a first opening for supplying a first fuel and an oxidant to the first reaction portion and a second opening for discharging an exhaust in the second reaction portion, the first and second openings being respectively at first sides of the first and second reaction portions, and the first and second reaction portions being connected with each other at second sides of the first and second reaction portions so that the flow of a fluid in the first and second reaction portions forms a counter flow;

a first catalyst layer in the first reaction portion;

a distributing portion, the distributing portion having a circumference substantially equal to a circumference of the first reaction portion and the entire distributing portion being between the first catalyst layer and the first opening; and a second catalyst layer in the second reaction portion, the second catalyst layer comprising a mesh layer and an active material coupled with the mesh layer, an active material amount of the active material in the second catalyst layer being less than that in the first catalyst layer and the active material of the second catalyst layer being coated at a density between about 0.01 and 0.4 g per 1 cc on the mesh layer.

19. The catalytic combustor according to claim 18, further comprising a fuel supply path for supplying a second fuel between the first and second reaction portions.

20. The catalytic combustor according to claim 19, wherein the fuel supply path is configured to supply the second fuel in an amount between about 1% and about 15% of the supply amount of the first fuel.

21. The catalytic combustor according to claim 19, wherein the second fuel comprises an off gas containing hydrogen, discharged from an anode of a fuel cell.

22. A fuel reformer comprising:

a catalytic combustor; and a reforming reaction portion for generating a reformate by receiving heat energy generated from the catalytic combustor and for reforming a fuel, wherein the catalytic combustor comprises:

a housing having a cylindrical first reaction portion and a second reaction portion surrounding the first reaction portion in a double tube shape, the housing having a first opening for supplying a first fuel and an oxidant to the first reaction portion and a second opening for discharging an exhaust in the second reaction portion, the first and second openings being respectively at first sides of the first and second reaction portions, and the first and second reaction portions being connected with each other at second sides of the first and second reaction portions so that the flow of a fluid in the first and second reaction portions forms a counter flow;

a first catalyst layer in the first reaction portion;

a distributing portion, the distributing portion having a circumference substantially equal to a circumference of the first reaction portion and the entire distributing portion being between the first catalyst layer and the first opening;

a mesh layer in the second reaction portion and configured to be heated by a heat of the first reaction portion, the mesh layer comprising a first-stage mesh layer and a second-stage mesh layer; and a second catalyst layer in the second reaction portion, the second catalyst layer comprising the mesh layer and an active material coupled with the mesh layer, an active material amount of the active material in the second catalyst layer being less than that in the first catalyst layer and the active material of the second catalyst layer being coated at a density between about 0.01 and 0.4 g per 1 cc on the mesh layer, the first-stage mesh layer and the second-stage mesh layer being separated by a space.

23. The fuel reformer according to claim 22, further comprising a fuel supply path for supplying a second fuel between the first and second reaction portions.

24. The fuel reformer according to claim 22, further comprising a fuel supply path for supplying a second fuel between the first and second reaction portions.

* * * * *

UNITED STATES PATENT AND TRADEMARK OFFICE
CERTIFICATE OF CORRECTION

PATENT NO. : 8,617,269 B2  
APPLICATION NO. : 12/616115  
DATED : December 31, 2013  
INVENTOR(S) : In-Hyuk Son et al.

Page 1 of 1

It is certified that error appears in the above-identified patent and that said Letters Patent is hereby corrected as shown below:

On the Title Page

Below Abstract,   Delete "24 Claims, 6 Drawing Sheets"
   Insert -- 23 Claims, 6 Drawing Sheets --

Item (56) References Cited, page 2,   After "DE 102 34 043"
Foreign Patent Documents,   Insert -- A1 --
left column, line 12

In the Claims

Column 13, Claim 24, lines 22-24   Delete Claim 24

Signed and Sealed this
Fifth Day of May, 2015

Michelle K. Lee
*Director of the United States Patent and Trademark Office*